United States Patent

[11] 3,592,207

[72] Inventor  Richard A. Borello
               4060 Grant Road, Mountain View, Calif. 94040
[21] Appl. No. 823,707
[22] Filed     May 12, 1969
[45] Patented  July 13, 1971

[54] AIR DUCT CLOSURE
     5 Claims, 4 Drawing Figs.
[52] U.S. Cl. .......................................... 137/1, 98/1,
                     98/86, 137/75, 138/89, 169/19
[51] Int. Cl. ...................................... E03b 1/00,
                                                  F16k 13/04
[50] Field of Search ........................... 169/19, 42;
           137/72, 251, 73, 74, 75, 1; 138/89, 97; 98/1, 86

[56]            References Cited
             UNITED STATES PATENTS
2,166,277  7/1939  Adams ......................... 137/74 X
2,664,955  1/1954  Winkler ........................ 169/42 X
3,144,049  8/1964  Ginsburgh ..................... 138/97
3,340,336  9/1967  Bender ......................... 138/97 X Primary Examiner—William F. O'Dea
Assistant Examiner—P. D. Ferguson
Attorney—Vanderveer Voorhees ABSTRACT: A closure for a ventilating or heating duct comprises a plug or pillow of a foamed plastic automatically injected into the duct by a propellant, through a temperature sensitive valve which opens at a predetermined temperature as in case of fire.

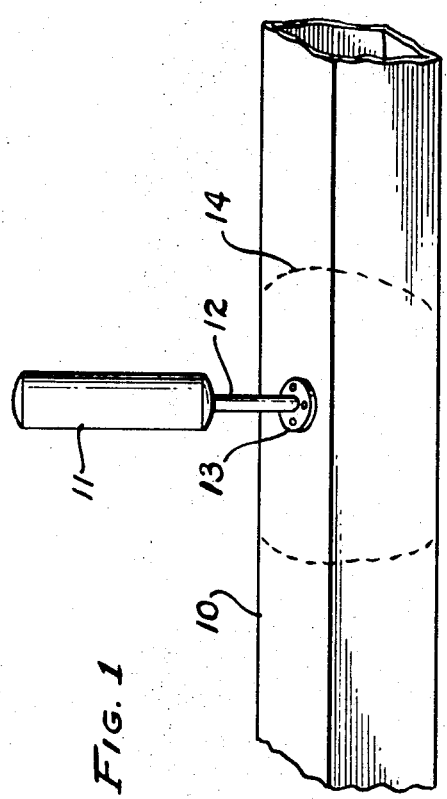
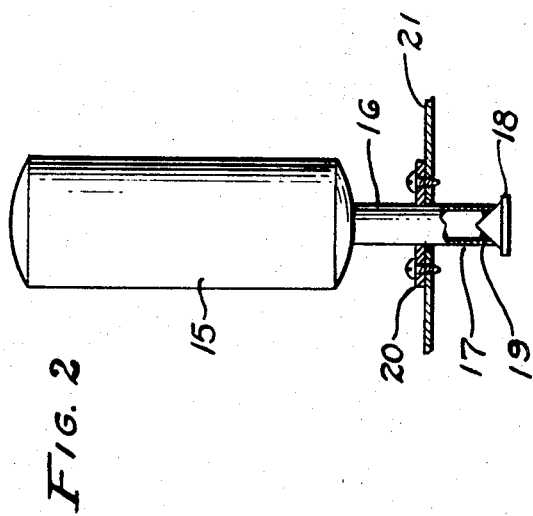
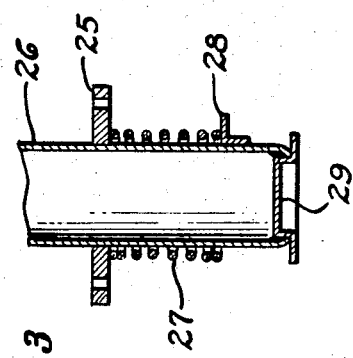
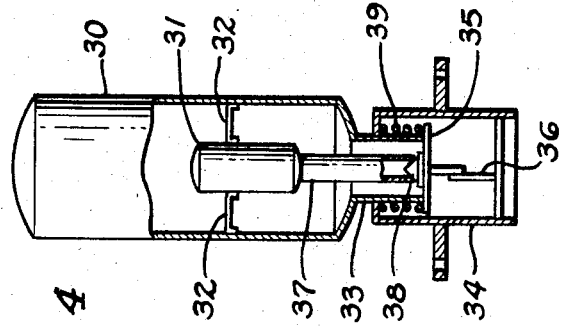

AIR DUCT CLOSURE

This invention relates to a device and method for closing an air duct or other passage for gases flowing at moderately low pressure, particularly the ducts employed in warm air heating of houses and other buildings and the air conditioning thereof. Such ducts are commonly made of sheet metal but can also be made of other materials such as rigid plastic-impregnated fabric such as glass fabric. Heretofore it has been the practice to close such ducts in case of fire by means of a damper, usually closed by a spring which is released by the melting of a fusible link selected to melt at a predetermined temperature, for example in the range of 150° to 225° F. Such dampers are shown in the following U.S. Pat. Nos. 2,242,738; 2,270,073; 2,675,707; 3,076,469; 3,165,050; 3,312,159. Such dampers suffer the disadvantage of involving costly mechanisms and doubtful reliability, in view of the long period of time they must remain idle, yet be ready to function properly in the event of a fire, even though safety codes may require them to be inspected periodically. Inasmuch as ducts are commonly located behind partitions, it is not easy to gain access for inspection. Moveable parts of such mechanical dampers are often subject to rusting and accumulation of dirt, dust and debris which may prevent them operating when an emergency arises.

One object of my invention is to provide a duct closure which is substantially without moving parts, thereby insuring positive action in an emergency. Another object of the invention is to provide a duct closure which is less costly to manufacture and install. Another object of the invention is to provide a duct closure which will require no periodic servicing or maintenance. Other objects will become apparent from the description which follows.

The invention is illustrated by a drawing which shows, in FIG. 1, the application to a horizontal duct. FIG. 2 shows the construction, partly in section, of a simple form of the device. FIG. 3 shows an alternative form of the temperature-sensitive actuating mechanism. FIG. 4 shows, partly in section, design of a device for two components.

I have now discovered that an air duct or similar structure through which gases are flowing at low pressure differential, e.g. 0.3 to 2 inches of water pressure per 100 linear feet, can be instantly and effectively closed in an emergency by injecting thereinto, a foam generating fluid which expands to fill the interior of the duct through a short distance, for example, a distance about equal to the diameter of the duct. I have provided a valve to retain the said liquid in a container under sufficient pressure to force the liquid into the duct when the temperature of the duct reaches a dangerous level, e.g. 180° F. Any desired temperature can be selected at which the valve will open automatically, usually in the range of 150° F. to 225° F. For this purpose I prefer to employ a link secured by Wood's metal having the desired melting point as well known in the art. Other temperature actuated releasing devices can be used such as a glass tube enclosing a low boiling liquid which expands and ruptures the tube 16 a selected temperature, also well known in the art.

Because of the need for instant injection of the foam generating liquid into the duct, I have provided a quick acting valve in which a spring assists in releasing the seal closing the orifice leading from the pressurized liquid container to the duct. I have also provided a fusible metal seal for the orifice which will retain the liquid for an indefinite time, e.g. 10 or 20 years in the hermetically sealed container, yet will release easily and instantly when emergency arises. A solder melting at about 5° F. to 15° F. below the melting point of the Wood's metal link is satisfactory.

Many foam-generating liquids can be used in my invention. These may be of the single liquid, self-foaming type which produce foam on releasing pressure, or of the two liquid type which foam on mixing. The latter type has long been used in fire fighting and usually involves mixing a gelatinous aqueous solution of bicarbonate with an acid. Various gelatinous materials can be used such as the alginates, hydroxy ethyl cellulose, methyl cellulose, and the guar gums. Acids can be sulfuric acid, acetic acid, sulfamic acid, and acid salts such as acid sodium sulfate and acid sodium phosphate. Colloidal solids such as bentonite and montmorillonite clays and colloidal silica, sodium silicate and the like can be added to stabilize the foam and lend fire resistance. Other water soluble thickeners are casein, gelatin and dimethyl pyrrolidone. Aqueous solutions of foam-generating liquids can be protected against fermentation and bacterial decomposition by adding small bacteriostatic amounts, e.g. 0.1 to 1 percent of bactericides such as phenol, cresylic acid, paraformaldehyde and the like. The propellant for the foam-generating liquid is a gas which is retained in the liquid container under pressure, e.g. 10 to 100 p.s.i. I prefer to use a nonflammable gas such as $CO_2$, nitrous oxide or a halocarbon. Freon 12, which is dichlor-difluor methane, is especially suitable.

High molecular weight polymers having sufficient viscosity to form a stable foam or froth without breaking, are particularly convenient. They can be propelled with Freon which serves also as a blowing agent to produce the foam on release of pressure. In the container, under pressure most of the Freon will be in solution in the plastic liquid, reducing the viscosity and thus accelerating injection of the liquid into the duct when the quick acting valve opens. Gum rubber dissolved in trichlor-ethylene or similar solvent can be used as the foam-generating liquid. Polybutene and polypropylene having molecular weights in the range of 5,000 to 50,000 can be used. They can be reduced in viscosity if desired by addition of carbontetrachloride or similar, preferably nonflammable, solvent. Following is an example of the use of such a foam-generating liquid:

Example

Six-tenths of a pound of polybutene having a molecular weight of about 8,000 was charged to an aerosol container having a volume of 1 pint. Five ounces of Freon 12 was then introduced and the container was sealed as described hereinafter. If the container and Freon are cooled to —40° F. or below, it can be charged and sealed at atmospheric pressure. When the container is heated to 150°F. and discharged by breaking the seal, the contents are ejected as a sticky foam having a volume of about 1 cubic foot, sufficient to completely plug a duct of 8 to 10 inches in cross section, the foam adhering tightly to the inner surfaces of the duct.

Most fire codes require only that the duct be closed for a period of at least 1 hour. When desired to produce a more permanent foam, it can be done by the use of partially polymerized or condensed resin, in the so-called "A" stage, a catalyst being introduced at the moment of ejection to harden it. For this purpose, a separate catalyst supply is provided as described hereinafter, both containers being opened simultaneously so that the catalyst is mixed with the plastic liquid before entering the duct. Partially polymerized polyurethane liquid resin can be catalysed to a solid foam in a few minutes by means of peroxide catalysts such as cumene peroxide, acetyl peroxide, and the like. Similarly polystyrene "A" stage resin can be polymerized by peroxides or boron fluoride in ether solution. Solid foams can also be made with the glyptal resins in a similar manner. Epoxy resins are catalysed with about 10 percent of an amine such as ethylene diamine. It is desirable to add a viscosity control agent to the amine to regulate the rate of flow so that both resin and catalyst will be exhausted from their containers at the same time. Polybutene or a methacrylate polymer can be used for this purpose, one such being known by the trade name "Acryloid."

A fire retardant resin can be made by condensing glycol and tetrabrom phthalic anhydride.

Furfuralcohol, in which is dissolved cellulose acetate or other soluble resin to provide the required viscosity and surface tension for foam-generation can be catalysed with acids such as HCl gas, $BF_3$, etc. to give solid foams of great permanence.

It is generally to employ enough blowing agent to give foams having a density of about 0.5 to 1 lb. per cu. ft., a satisfactory density being 0.8 lbs. per cu. ft. The size of pressurized container employed will vary with the cross-sectional sectional area of the duct to be closed. Thus a duct of 14 to 16 inches diameter can be closed with 1 quart of foam-generating liquid. To place the duct in service again after the fire, the foam plug is removed by removing a panel in the side of the duct provided for the purpose and digging out the plug. Of course, this usually is only required in those rare instances when there has been a fire in the building where the duct is located.

Referring now to the drawing, FIG. 1 shows a typical horizontal duct 10 to which is attached aerosol foam-generator 11 by delivery tube 12 provided with flange 13 for attachment to the wall of the duct, usually by means of self-threading screws. When the temperature within the duct reaches a dangerous level, for example 180° F., the thermally controlled orifice of tube 12, extending to a point within the duct, opens suddenly releasing the charge of foam-generating liquid from cylinder 11. The resulting foam expands to form a mass indicated by dotted line 14, completely filling a section of the duct and adhering to the walls thereof.

FIG. 2 shows a view of the valve which controls the outlet from the cylinder, partly cut away. Pressurized container 15 is connected to tube 16 leading to orifice 17 closed by cone plug 18 held in place by Wood's metal seal 19. Flange 20 is provided to attach the apparatus to the duct wall 21 through which a hole is made slightly larger than the outside diameter of the tube 16 and valve assembly at the end thereof. When the temperature reaches a dangerous level, seal 19 melts, releasing plug 18 and admitting the foam-generating liquid into the duct.

FIG. 3 shows a modification of the valve shown in FIG. 2 but arranged for positive quick action. Flange 25 surrounding tube 26 supports coil spring 27 which is held in compression by latch 28 attached to the wall of tube 26 by Wood's metal solder. The end of tube 26 is slightly constricted to retain cap 29 whose periphery extends outwardly, so that when latch 28 is released by the fusion of the Wood's metal solder, the spring 27 expands, delivering a blow sufficient to dislodge cap 29, suddenly releasing the contents of the aerosol bomb into the duct. The cap 29 may be sealed to the duct 26 by a rubber or plastic sealing composition, but I prefer to use a Wood's metal solder having a slightly lower fusion point, e.g. 5° to 15° F. lower, than that of the metal supporting latch 28, thus insuring a hermetic seal of the contents of the aerosol bomb over a long period of time, for example, 10 years or longer.

FIG. 4 shows the construction of a foam-generator in which a catalyst injector is provided to deliver a catalyst simultaneously with the discharge of the plastic foam-generating liquid. Container 30 is shown partially cut away to reveal the catalyst container 31 supported within by brackets 32. The discharge tube 33 leading from bomb 30 to outlet 34 extending into the ventilating duct, not shown, is closed at the lower end by disc 35 held in place by support 36. Support 36 is in two parts with an inverted "T" configuration, the leg of the "T" being held together by Wood's metal having the desired fusion temperature at which the duct must be closed. Other design of support can be used, obviously. The catalyst delivery tube 37 is closed by plug 38 supported on plate 35. Slightly lower melting Wood's metal solder can be used on both plug 38 and disc 35, so they will be free to open when support 36 fails with heat. Compressed spring 39 is provided to insure rapid, simultaneous opening of both orifices on failure of support 36, thereby delivering both plastic and catalyst at the desired rate, mixing taking place in outlet 34. In the case of vertical or inclined ducts, an elbow in the conduit 16 can be provided to keep the container 15 in a vertical position.

Although container 31 is referred to hereinabove as a catalyst container, it can be used in the same manner for acid or other solution when producing foam by chemical action between two solutions such as bicarbonate and acid as described hereinabove. Also, I have described certain blowing agents for use in my process but do not intend my invention be limited to them. Other such agents well known in the art can be used such as those organic compounds which liberate $CO_2$ or nitrogen on heating in presence of catalysts.

Although not shown in the drawing, I may employ a foraminous partition in the duct near the point of admission of foam to assist in retaining the plug of foam in position. Two such partitions can be used, generally spaced within the diameter of the duct across the section thereof. Coarse wire cloth, e.g. of one-half to 2 inches mesh is suitable and will not materially impede air flow.

Having thus described my invention, what I claim is:

1. The method of closing a duct employed for conveying air and other gases which comprises injecting into said duct a stable, adherent plastic foam in sufficient volume to fill a section of said duct, said foam being formed from a foam-generating liquid released into the duct automatically when the temperature of the duct rises to a predetermined point.

2. An apparatus for closing an air duct in case of fire comprising a container attached to an air duct, a foam-generating liquid capable of forming an adherent plastic foam mass, held under pressure by a propellant gas within said container, a conduit leading from the outlet of said container into said duct, and a closure for said conduit controlled by a temperature sensitive element set to release said closure at a predetermined temperature, whereupon a mass of adherent plastic foam is injected into said duct effectively closing it to the passage of air therethrough.

3. The apparatus of claim 2 wherein said temperature sensitive element is a fusible metal link.

4. The apparatus of claim 2 wherein said temperature sensitive element is a fusible metal link and said closure is sealed to said conduit with a fusible solder having a melting point about 5° F. to 15° F. below the melting point of said fusible link.

5. The apparatus of claim 2 wherein a second container is provided having an outlet contiguous with the outlet of said foam-generating container and a closure therefor integral with the closure of said first container, both said closures being opened simultaneously by the action of said temperature sensitive element.